United States Patent
Trumble et al.

(10) Patent No.: US 7,881,919 B2
(45) Date of Patent: Feb. 1, 2011

(54) USB DEVICE SIMULATOR

(75) Inventors: Art Trumble, Kirkland, WA (US); Tuan D. Le, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 11/695,880

(22) Filed: Apr. 3, 2007

(65) Prior Publication Data

US 2008/0249759 A1    Oct. 9, 2008

(51) Int. Cl.
*G06F 9/455* (2006.01)
*G06F 9/46* (2006.01)
*G06F 3/00* (2006.01)
*G06F 13/12* (2006.01)
*G06F 13/00* (2006.01)
*G06F 13/14* (2006.01)
*G06F 13/20* (2006.01)

(52) U.S. Cl. .................. 703/21; 703/23; 703/24; 703/27; 718/100; 710/1; 710/8; 710/10; 710/14; 710/15; 710/38; 710/62; 710/67; 710/100; 710/305; 710/313

(58) Field of Classification Search .................. 703/21, 703/23, 24, 27; 718/100; 710/1, 8, 10, 14, 710/15, 38, 62, 67, 100, 313, 305
See application file for complete search history.

(56) References Cited

U.S. PATENT DOCUMENTS

| | | | |
|---|---|---|---|
| 5,953,516 A | 9/1999 | Bonola | |
| 6,081,856 A * | 6/2000 | Comer | 710/67 |
| 6,279,122 B1 | 8/2001 | Hitchcock et al. | |
| 6,427,224 B1 | 7/2002 | Devins et al. | |
| 6,636,929 B1 * | 10/2003 | Frantz et al. | 710/313 |
| 6,738,834 B1 * | 5/2004 | Williams et al. | 710/8 |
| 6,868,545 B1 | 3/2005 | Devins et al. | |
| 6,886,111 B1 | 4/2005 | Tran | |
| 6,968,307 B1 * | 11/2005 | Chrysanthakopoulos | 703/27 |
| 6,973,512 B1 * | 12/2005 | Koeman | 710/38 |
| 7,069,347 B1 * | 6/2006 | Kolokowsky | 710/8 |
| 7,069,546 B2 | 6/2006 | Tsarfati | |
| 7,181,382 B2 * | 2/2007 | Shier et al. | 703/13 |
| 7,383,547 B1 * | 6/2008 | Miri | 718/100 |

(Continued)

OTHER PUBLICATIONS

Reichenthal, Steven. "SRML—Simulation Reference Markup Language", Dec. 18, 2002.*

(Continued)

*Primary Examiner*—Kamini S Shah
*Assistant Examiner*—Shambhavi Patel
(74) *Attorney, Agent, or Firm*—Lee & Hayes, PLLC

(57) ABSTRACT

Techniques for simulating universal serial bus (USB) video devices are described. In one example, a document containing a USB video device descriptor set is loaded by a device simulator application. The document is parsed and the descriptor set is extracted. The descriptor set is then used to define a simulated USB video device. A device simulation framework simulates a USB device attachment to a computing device and video data is streamed from the simulated USB video device to the computing device. A video driver associated with the computing device processes the video data as if the data originated from USB video device hardware. Multiple different USB video devices may be simulated and different collections and configurations of video data can be utilized.

13 Claims, 4 Drawing Sheets

U.S. PATENT DOCUMENTS

| | | | |
|---|---|---|---|
| 2003/0177297 A1* | 9/2003 | Hesse et al. | 710/305 |
| 2005/0015702 A1 | 1/2005 | Shier et al. | |
| 2005/0179674 A1 | 8/2005 | Mehrotra et al. | |
| 2006/0004554 A1* | 1/2006 | Vega et al. | 703/6 |
| 2006/0130074 A1 | 6/2006 | Kumar | |
| 2006/0161415 A1 | 7/2006 | Takahashi et al. | |
| 2006/0248526 A1* | 11/2006 | Rostampour | 718/1 |
| 2008/0005446 A1* | 1/2008 | Frantz et al. | 710/313 |

OTHER PUBLICATIONS

Thibault et al. "Domain Specific Languages: From Design to Implementation Application to Video Device Drivers Generation", IEEE Transactions on Software Engingeering, vol. 25, No. 3, May/Jun. 1999.*

Shoumeng et al. "A Simulation Framework for Device Driver Development", Aug. 2002.*

"Development Techniques for Using Simulation to Remove Risk in Software/Hardware Integration", retrieved on Feb. 15, 2007, at <<http://www.redaht.com/support/wpapers/cygnus/cygnus_risk/development.html>>, pp. 1-3.

"NET2272", available at least as early as Feb. 14, 2007, at <<http://www.plxtech.com/pdf/apps/ExApps18_MobilePhone.pdf>>, PLX Technology, Inc., 2005, pp. 1-2.

Quicksall, et al., "Simulation and Device-Driver Development", retrieved on Feb. 15, 2007, at <<http://www.ddj.com/184410111>>, CMP Technology, 2007, pp. 1-11.

Shoumeng, et al., "A Simulation Framework for Device Driver Development", available at least as early as Feb. 14, 2007, at <<http://www.linuxdevices.com/files/article032/u01_shoumeng.pdf>>, pp. 1-4.

* cited by examiner

USB DEVICE SIMULATOR

BACKGROUND

The universal serial bus (USB) peripheral interface standard has experienced wide integration into most current computing environments. Indeed, it is quickly replacing older connection methods, such as the non-standardized serial and parallel ports, as the primary interface standard. Examples of devices that can interface with a computer using the USB standard include mouse devices, keyboards, joysticks, audio and video devices, memory devices, and the like. Thus, the USB standard gives manufacturers the ability to construct an array of devices with a variety of capabilities that all utilize the USB interface standard.

A drawback that comes with implementing a variety of devices using a single interface standard is the need for multiple device drivers, one for each device. One way of addressing the issue of multiple device drivers is through the creation and implementation of class drivers. A class driver is a higher-level driver that typically provides hardware-independent support for a class of physical devices. The developer of an operating system can package multiple class drivers with its operating system and thus obviate the need to load a new device driver for every device that a user wants to interface with his or her computer. For example, an operating system that is installed on a computer may include a USB video class device driver that is created based on the USB Device Class Definition for Video Devices specification (hereinafter "video specification")(version 1.0, et seq., available from the USB Implementers Forum). If a USB video device that complies with the video specification is plugged into the computer, the USB video class driver should enable the USB video device to interact with the computer and operate as intended by the device's manufacturer. However, due to the complexities of operating system design and the USB video specification, there are instances where the configuration of an operating system and/or a particular USB video device may be such that the USB video device does not function properly with the operating system.

SUMMARY

Techniques for simulating universal serial bus (USB) devices are described. In one example, a document containing a USB video device descriptor set is loaded by a device simulator application. The document is parsed and the descriptor set is extracted. The descriptor set is then used to define a simulated USB video device. A device simulation framework simulates the attachment of a USB device to a computing device, and video data is streamed from the simulated USB video device to the computing device. A video driver associated with the computing device processes the video data as if the data originated from USB video device hardware. Multiple different USB video devices may be simulated and different collections and configurations of video data can be utilized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to techniques for simulating a universal serial bus (USB) video device. Examples of video devices that can utilize the USB interface include web cameras (webcams), digital camcorders, analog-to-digital video converters, still-image digital cameras, and the like. The USB interface presents a fast and convenient means to connect such devices to a computing device. In many instances, a USB video device can be connected to a computing device while the computing device is operating, and the USB video device can begin interfacing with the computing device without requiring a computing device reboot (i.e., hot plugging or hot swapping). Software developers and other vendors of USB-related products benefit from the ability to test their products using multiple possible configurations of USB video devices. Accordingly, the described techniques enable a wide variety of USB video devices to be simulated by simply defining each device as a set of USB device descriptors Each set of device descriptors can be stored as a document (e.g., an extensible markup language (XML) document) that defines a particular USB video device. When an entity wishes to simulate a particular device, the entity loads the corresponding USB device descriptor document and utilizing a USB video device simulator, simulates the interaction of actual USB video device hardware with the product that the entity wishes to test.

In one exemplary implementation, the developer of a computer operating system may include one or more device drivers (such as USB device class drivers) with its operating system that the developer would like to test with multiple configurations of USB devices. The developer could define each device with the appropriate descriptor set document and simulate each device using the described techniques. While the techniques discussed herein are presented in the context of USB video class devices, other types and classes of devices may also be simulated, such as USB audio class devices, communications class devices, human interface class devices, and the like. In addition to the USB interface standard, other interface standards may also use the described techniques, such a parallel port interfaces, Ethernet interfaces, PC card interfaces, IEEE 1394 interfaces, and the like.

Figure 1:
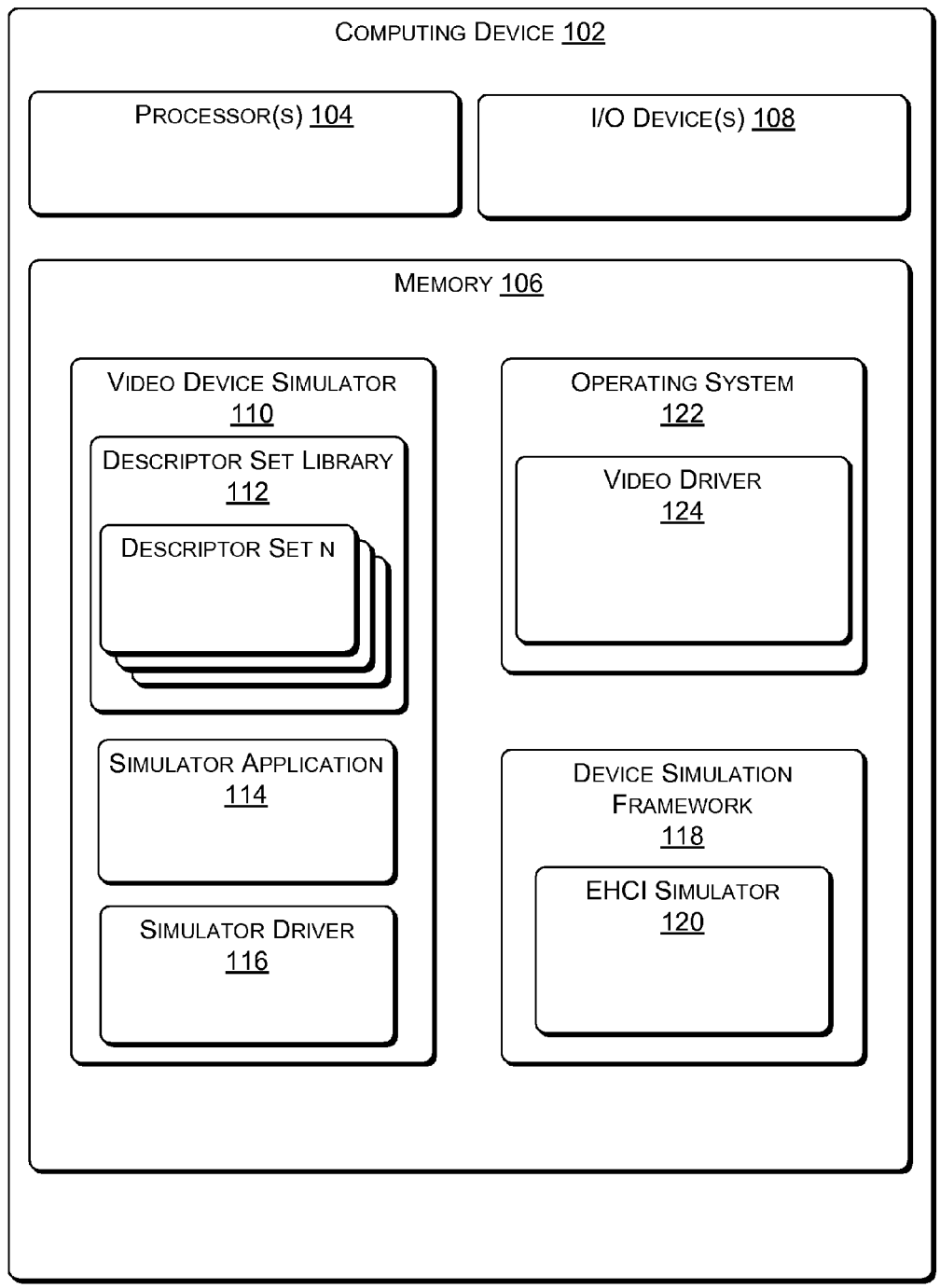
FIG. 1 is a block diagram of a computing device and a simulator executable on the computing device to simulate a universal serial bus video device.

FIG. 1 illustrates various components of an exemplary computing device 102 suitable for implementing video device simulator 110. Computing device 102 may be implemented as any of a variety of conventional computing devices including, for example, a desktop computer, a server, a notebook or portable computer, a workstation, a mainframe computer, a mobile communication device, a PDA, an entertainment device, a set-top box, an Internet appliance, a game console, and so forth. The computing device 102 can include, but is not limited to, one or more processors 104, a memory 106, Input/Output (I/O) devices 108 (e.g., keyboard and mouse), and a system bus (not shown) that operatively couples various components including processor(s) 104 to memory 106. Computing device 102 includes a system bus that represents any of the several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus. Computing device 102 may also include multiple interface ports, such as serial and parallel ports, and may further include one or more USB interfaces or ports.

Memory 106 includes computer-readable media in the form of volatile memory, such as Random Access Memory (RAM) and/or non-volatile memory, such as Read Only Memory (ROM) or flash RAM. Memory 106 typically includes data and/or program modules for implementing video device simulator 110 that are immediately accessible to and/or presently operated on by processor(s) 104.

Memory 106 also includes video device simulator 110 that can be implemented to simulate one or more USB video devices. Video device simulator 110 includes descriptor set library 112, simulator application 114, and simulator driver 116. Descriptor set library 112 includes a plurality of descriptor sets. Each descriptor set in descriptor set library 112 is used to define a particular USB video device. In one implementation, each descriptor set is an extensible markup language (XML) document that contains a descriptor set as XML code. Other implementations may utilize other methods for defining a descriptor set, including any other suitable markup and/or programming language. For example, descriptor sets may be copied from USB device hardware to clone the USB device for simulation and testing purposes.

As part of the device simulation process, simulator application 114 loads a descriptor set and parses the descriptor set to extract the USB video device descriptors. Simulator driver 116 creates and implements descriptor objects (e.g., interface and endpoint objects) that are configured with descriptors provided by simulator application 114 to simulate a USB device. Simulator driver 116 also handles data communications to and from the simulated USB device, such as video device requests from computing device 102.

Device simulation framework 118 (hereinafter "DSF") is also stored in memory 106 to provide an architecture and programming framework to simulate USB devices in software. Thus, DSF 118 can simulate an existing or potential USB device without actually connecting USB device hardware to computing device 102. DSF 118 includes enhanced host controller interface simulator 120 (hereinafter "EHCI simulator"). EHCI simulator 120 simulates a host controller device interface and allows communication between video device simulator 110 and operating system 122. Operating system 122 includes video driver 124. In some implementations, video driver 124 is a USB video class device driver.

Descriptor Set Library

Figure 2:
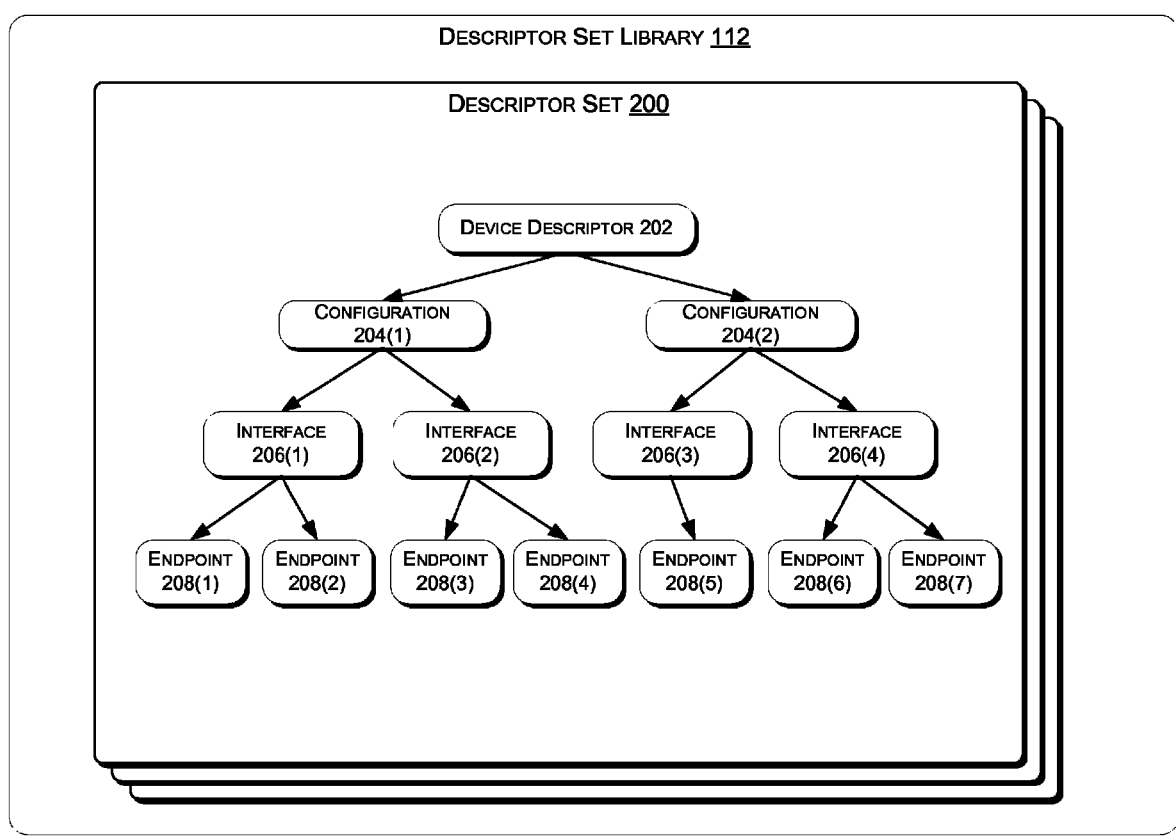
FIG. 2 illustrates an exemplary descriptor set library and an exemplary descriptor set document.

FIG. 2 shows an exemplary descriptor set library 112 that includes one or more descriptor sets 200. A descriptor is a data structure that contains information about a USB video device and its configuration(s). With respect to a particular device, a descriptor set describes "what it is" and "what it does". Descriptor set 200 is shown for purposes of example only, and a descriptor set library may contain any number and configuration of descriptor sets.

Each descriptor set 200 in library 112 contains descriptors to define a USB video device. Descriptor set 200 is an XML document that includes a set of device descriptors in XML code. Device descriptor 202 describes the general information that applies globally to a particular USB video device and all of the device's configurations. Each of configuration descriptors 204(1) and 204(2) provide information about specific device configurations. For example, a device may have one configuration descriptor that applies under normal power scenarios, and another configuration descriptor that applies under low power scenarios. While descriptor set 200 shows two configuration descriptors, most legacy USB devices utilize only one configuration descriptor. As such, this example is not intended to be limiting, and a simulated USB device may utilize any suitable number of configuration descriptors. Each configuration descriptor has one or more interface descriptors, such as interface descriptors 206(1) and 206(2) for configuration descriptor 204(1), and interface descriptors 206(3) and 206(4) for configuration descriptor 204(2). Each interface descriptor describes a particular interface within a USB device configuration and can allow for changes in device characteristics after a device has undergone the configuration process. For example, a USB video device may have one interface descriptor that is applies when only the device's camera is activated, and another interface descriptor that applies when both the camera and a microphone are activated. In some implementations, alternate interface descriptors are used to select endpoint sets that correspond to one or more desired bandwidths.

Descriptor set 200 also includes endpoint descriptors 208(1)-208(7), each associated with a specific interface descriptor. Each endpoint descriptor includes information required by a host to determine the bandwidth requirements of each device endpoint, and each device endpoint represents a logical data source or data sink for a particular device.

Presented below are several examples of USB device descriptors in XML code:

Exemplary USB Device Descriptor

```
<?xml version="1.0"?>
<data>
    <!-- Keyed to UVC driver 1.0 RTM -->
    <!-- Last update May 2005 -->
    <!-- All numbers are in hex unless specifically noted otherwise -->
<!-- BEGIN DeviceDescriptor/DeviceQualifierDescriptor -->
    <!-- There is only 1 of this set per device. -->
    <!-- -->
  <!-- bDescriptorType   - set to DEVICE descriptor type (1) -->
  <!-- bcdUSB            - USB Spec release number in BCD. Set to (200) -->
  <!-- bDeviceClass      - Class code (assigned by the USB-IF). If this field is 0,
each -->
        <!--               - interface within a configuration specifies its own class -->
```

-continued

```
    <!--          - information and the various interfaces operate independently -->
    <!-- bDeviceSubClass  - Subclass code (assigned by the USB-IF). -->
    <!--          - If bDeviceClass is 0, this must be 0 -->
    <!-- bDeviceProtocol  - Protocol code (assigned by the USB-IF). If this field is
0, device -->
    <!--          - does not useclass-specific protocols on a device basis. It may -->
    <!--          - use them on an interface basis -->
    <!-- bMaxPacketSize0 - Max packet size for endpoint zero (must be x8, x10,
x20 or x40) -->
    <!-- idVendor        - Vendor ID (assigned by the USB-IF) -->
    <!-- idProduct       - Product ID (assigned by manufacturer) -->
    <!-- bcdDevice       - Device release number in binary-coded decimal -->
    <!--                 - Set to 100 for base spec 1.00 -->
    <!-- iManufacturer   - Index of string descriptor manufacturer name -->
    <!-- iProduct        - Index of string descriptor product name -->
    <!-- iSerialNumber   - Index of string descriptor for unique serial number -->
    <!-- bNumConfigurations - Number of possible configurations (1 for Windows
devices) -->
    <descriptor type = "DeviceDescriptor">
        <bLength                      type = "Byte">
0x12         </bLength>
        <bDescriptorType              type = "Byte">         0x01
</bDescriptorType>
        <bcdUSB                       type = "Word">
0x0200       </bcdUSB>
        <bDeviceClass                 type = "Byte">
0xEF         </bDeviceClass>
        <bDeviceSubClass              type = "Byte">         0x02
</bDeviceSubClass>
        <bDeviceProtocol              type = "Byte">         0x01
</bDeviceProtocol>
        <bMaxPacketSize               type = "Byte">
0x40         </bMaxPacketSize>
        <idVendor                     type = "Word">
0x045E </idVendor>
        <idProduct                    type = "Word">
0xFF81 </idProduct>
        <bcdDevice                    type = "Word">
0x0100 </bcdDevice>
        <iManufacturer                type = "Byte">
0x01 </iManufacturer>
        <iProduct                     type = "Byte">
0x02 </iProduct>
        <iSerialNumber                type = "Byte">
0x03         </iSerialNumber>
      <bNumConfigurations             type = "Byte"> 0x01
</bNumConfigurations>
    </descriptor>
    <!-- Devices with multiple speed capabilities require a device_qualifier descriptor. -->
  <!-- The device_qualifier descriptor describes information about a high-speed capable -->
  <!-- device that would change if the device were operating at the other speed -->
    <!-- The UVC driver supports Full and High Speeds -->
    <!-- -->
  <!-- bDescriptorType  - set to DEVICEQUALIFIER descriptor type (6) -->
    <!-- bcdUSB          - USB Spec release number in BCD -->
    <!-- bDeviceClass    - Class code (see DEVICE descriptor) -->
    <!-- bDeviceSubClass - Subclass code (see DEVICE descriptor) -->
    <!-- bDeviceProtocol - Protocol code (see DEVICE descriptor) -->
    <!-- bMaxPacketSize0 - Maximum packet size for other speed (see DEVICE
descriptor) -->
    <!-- bNumConfigurations - Number of Other-speed configurations -->
    <!-- bReserved       - Reserved for future use, must be 0 -->
    <descriptor type = "DeviceQualifierDescriptor" >
    <bLength                          type = "Byte">
0x0A         </bLength>
        <bDescriptorType              type = "Byte">         0x06
</bDescriptorType>
        <bcdUSB                       type = "Word">
0x0200       </bcdUSB>
        <bDeviceClass                 type = "Byte">
0x00         </bDeviceClass>
        <bDeviceSubClass              type = "Byte">         0x00
</bDeviceSubClass>
        <bDeviceProtocol              type = "Byte">         0x00
</bDeviceProtocol>
```

-continued

```
        <bMaxPacketSize           type = "Byte">
0x40            </bMaxPacketSize>
        <bNumConfigurations       type = "Byte"> 0x01
    </bNumConfigurations>
        <bReserved                type = "Byte">
0x00            </bReserved>
    </descriptor>
<!-- END DeviceDescriptor / DeviceQualifierDescriptor -->
```

Exemplary USB Configuration Descriptor

```
    <!-- BEGIN HighSpeed configuration -->
    <!-- This is a CONFIGURATION descriptor for HighSpeed (fastest, 25-400
Mbs) -->
    <!-- This configuration is exactly like FullSpeed configuration EXCEPT: -->
    <!-- - bConfigurationValue is 1 for High, 2 for Full -->
    <!-- - size of the bulk endpoint is 0x200 for High, 0x40 for Full-->
    <!-- - iString indexes for HighSpeed start with 0x03, for FullSpeed with 0x13
-->
    <!-- -->
    <!-- bDescriptorType    - set to CONFIGURATION descriptor type (2) -->
    <!-- ** IMPORTANT!! Length field follows -->
    <!-- wTotalLength       - size of ALL fields from here to "END HighSpeed
configuration" -->
    <!-- bNumInterfaces     - Number of interfaces supported by this configuration
-->
    <!-- bConfigurationValue - Value to use to select configuration. HighSpeed is
(1) -->
    <!-- iConfiguration     - index to string describing this interface -->
    <!-- bmAttributes       - bitmap to Configuration characteristics -->
    <!-- bMaxPower          - Max power consumption of device in 2 mA units -->
    <descriptor type = "HighSpeedConfigDescriptor">
        <bLength             type = "Byte">     0x09      </bLength>
        <bDescriptorType     type = "Byte">     0x02      </bDescriptorType>
        <wTotalLength        type = "Word">     0x0120    </wTotalLength>
        <bNumInterfaces      type = "Byte">     0x02      </bNumInterfaces>
        <bConfigurationValue type  =  "Byte">                      0x01
</bConfigurationValue>
        <iConfiguration      type = "Byte">     0x04      </iConfiguration>
        <bmAttributes        type = "Byte">     0x80      </bmAttributes>
        <bMaxPower           type = "Byte">     0x19      </bMaxPower>
    </descriptor>
```

Exemplary USB Interface Descriptors

```
    <!-- Video Control Interface Descriptor -->
    <!-- The interface descriptor describes a specific interface within a
configuration -->
    <!-- A configuration provides one or more interfaces, each with zero or more
endpoint -->
    <!-- descriptors describing a unique set of endpoints within the configuration
-->
    <!-- -->
    <!-- bDescriptorType    - set to INTERFACE descriptor type (4) -->
    <!-- bInterfaceNumber   - Zero-based value index to concurrent interfaces
supported by -->
    <!--                    - this configuration -->
    <!-- bAlternateSetting  - Value used to select this alternate setting for the
interface -->
    <!--                    - identified in prior field -->
    <!-- bNumEndpoints      - Number of endpoints used by this interface. 0 or 1
depending -->
    <!--                    - on whether optional status interrupt endpoint present -->
    <!-- bInterfaceClass - Set to (0E) CC_VIDEO -->
    <!-- bInterfaceSubClass - Set to 1 for SC_VIDEOCONTROL. -->
    <!-- bInterfaceProtocol - -->
    <!-- iInterface         - index to string describing this interface. -->
    <descriptor>
```

-continued

```
    <bLength              type = "Byte">    0x09      </bLength>
    <bDescriptorType      type = Byte">     0x04      </bDescriptorType>
    <bInterfaceNumber     type = "Byte">    0x00      </bInterfaceNumber>
    <bAlternateSetting    type = "Byte">    0x00      </bAlternateSetting>
    <bNumEndpoints        type = "Byte">    0x01      </bNumEndpoints>
    <bInterfaceClass      type = "Byte">    0x0E      </bInterfaceClass>
    <bInterfaceSubClass        type =   "Byte">             0x01
</bInterfaceSubClass>
    <bInterfaceProtocol   type = "Byte">    0x00      </bInterfaceProtocol>
    <iInterface           type = "Byte">    0x06      </iInterface>
  </descriptor>
  <!-- BEGIN Class Specific Video Control Interface -->
  <!-- The class specific VC interface descriptor is a concatenation of all
descriptors used -->
  <!-- to fully describe the video function (all Unit (UDs) and Terminal
Descriptors (TDs) -->
  <!-- -->
  <!-- bDescriptorType    - set to CS_INTERFACE descriptor type (24) -->
  <!-- bDescriptorSubType - set to VC_HEADER descriptor subtype (1) -->
  <!-- bcdVDC             - current Video Device Class Spec in BCD -->
  <!-- ** IMPORTANT!! Length field follows -->
  <!-- wTotalLength       - size of the following descriptor plus all units and
terminals -->
  <!--          through "END Class Specific Video Control Interface" -->
  <!--          !! Be sure to adjust wTotalLength if any sizes are changed
!! -->
  <!-- dwClockFrequency   - Device clock frequency in Hz. Specifics the units
for time -->
  <!--                    - information fields used in the data stream Video Sample
Headers -->
  <!-- bInCollection      - Number of VideoStreaming interfaces in this -->
  <!--                    - Video Interface Collection -->
  <!-- baInterfaceNr(1)   - First VideoStreaming interface number in Collection -
->
  <!-- baInterfaceNr(n)   - (Optional) Last VideoStreaming interface number in
Collection -->
  <descriptor>
    <bLength              type = "Byte">    0x0D      </bLength>
    <bDescriptorType      type = "Byte">    0x24      </bDescriptorType>
    <bDescriptorSubType        type = "Byte">               0x01
</bDescriptorSubType>
    <bcdVDC               type = "Word">    0x0100    </bcdVDC>
    <wTotalLength         type = "Word">    0x005D    </wTotalLength>
    <dwClockFrequency          type = "Dword">              0x000186A0
</dwClockFrequency>
    <bInCollection        type = "Byte">    0x01      </bInCollection>
    <baInterfaceNr        type = "Byte">    0x01      </baInterfaceNr>
  </descriptor>
```

Thus, utilizing similar descriptor sets allows entities such as software developers to create a library of USB video device descriptor sets that can be used to simulate a multitude of different USB video devices without the need to build the actual device hardware. The exemplary descriptors are presented for purposes of example only, and any type and configuration of device descriptors may be utilized without departing from the spirit and scope of the claimed embodiments.

Exemplary Process

Figure 3:
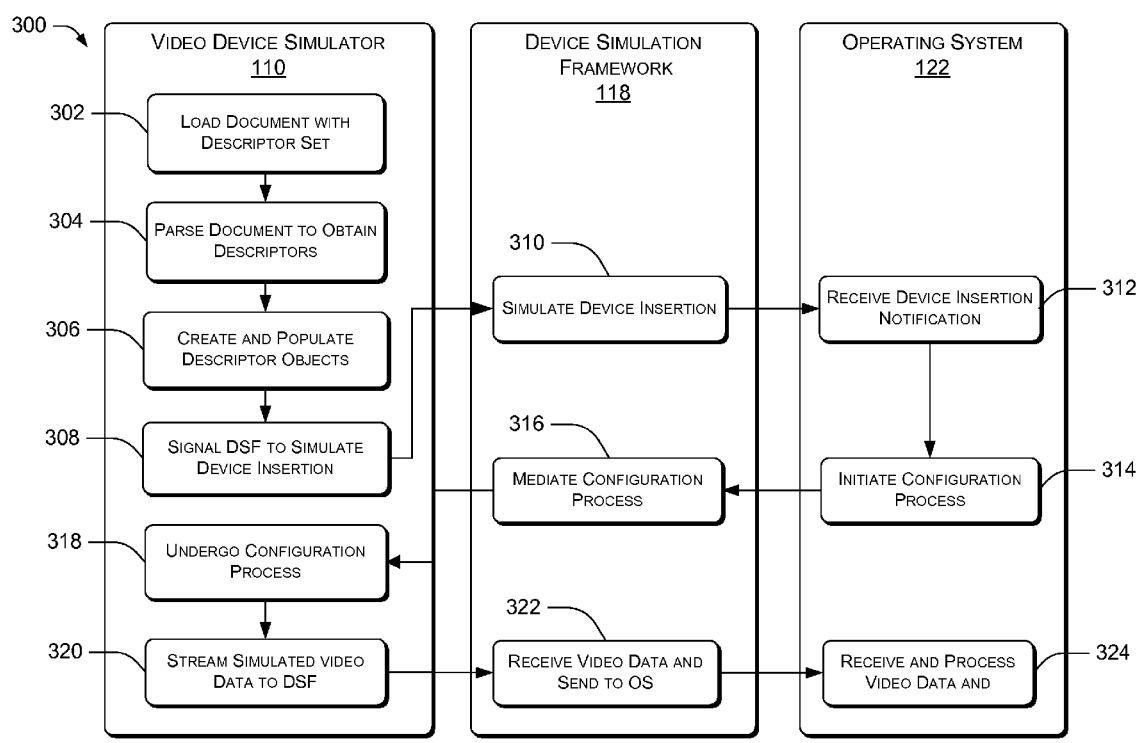
FIG. 3 is a flow diagram of an exemplary process for simulating a universal serial bus video device.

FIG. 3 shows an exemplary process 300 for simulating a USB video device. Process 300 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, process 300 is described with reference to computing device 102 shown in FIG. 1. The process is shown in reference to acts that occur on video device simulator 110, device simulation framework 118, and operating system 122.

At 302, simulator application 114 accesses descriptor set library 112 and loads a descriptor set document that corresponds to the USB video device to be simulated. At 304, device simulator application 114 parses the document to obtain the necessary descriptors to define the USB video device. At 306, simulator driver 116 creates descriptor objects and device simulator application 114 populates the objects with the device descriptors. DSF 118 utilizes the populated objects as part of the USB device simulation scenario. As used herein, the term "object" refers generally to a programming unit in object-oriented programming that groups together a data structure and the operations or methods that can use or affect the data.

At 308, device simulator application 114 prompts DSF 118 to simulate the insertion and/or connection of a USB video device into computing device 102. At 310, DSF 118 simulates the device insertion and/or connection. Although not specifically shown here, at any point in a device simulation scenario, DSF 118 may also simulate the removal of a USB device. Generally stated, DSF 118 is a device simulation mechanism that interacts with operating system 122 to simulate an actual hardware device. Accordingly, DSF 118 can interact with operating system 122 such that the operating system "believes" that it is interacting with an actual hardware device. In one example, DSF 118 includes one or more software modules stored on memory 106. In the context of USB device simulation, DSP 118 accomplishes simulated USB device insertion using EHCI (or USB port) simulator 120. EHCI simulator 120 includes a USB port driver that signals operating system 122 that a USB device has been inserted into the USB port. Thus, computing device 102 is unaware of the device simulation environment and operates as if actual USB video device hardware has been connected to the computer's USB port. In one example, simulator driver 116 interacts with and/or uses a softUSBdevice object from DSF 118 to simulate a USB device. The softUSBdevice object is a component object model (COM) object supplied by DSF 118 that is called to handle aspects of USB transactions, the device's descriptors, and interaction with operating system 122 and device driver 124.

At 312, operating system 122 receives notification of the simulated device insertion (which it interprets as an actual hardware connection) and at 314, initiates the USB video device configuration processes. At 316, DSF 118 mediates the configuration process between video device simulator 110 and operating system 122 by passing data through simulated EHCI port 120. At 318, video device simulator 110 interacts with operating system 122 to accomplish the USB video device configuration process. The USB video device configuration process involves, among other things, assigning an identifier to the simulated device and reading the USB device descriptor set obtained at act 304 to determine the correct driver(s) and power requirements for the simulated device. In one example, operating system 122 reads the device descriptors and determines that the simulated device is a USB video class device and would thus initiate the appropriate device driver, such as video driver 124. Video driver 124 may be a USB video class driver.

At 320, video device simulator 110 streams video data to simulated EHCI port 120 on DSF 118. The video data may come from one or more video data files loaded by simulator application 114. The video data files may be stored on memory 106 or may be loaded from an external data storage medium, such as a CD-ROM, DVD, or any other suitable computer-readable data storage medium. In some implementations, video data may be generated or synthesized dynamically at runtime. At 322, DSF 118 sends the video data to video driver 124 on operating system 122. At 324, the video data is received and processes by operating system 122 and/or video driver 124. The processed video data may then be compared to the original video data streamed from video device simulator 110 to determine how video driver 124 and/or operating system 122 respond to the data. Specific features of the video data and the processed video data may also be examined, such as frame count(s), frame rate(s), timestamp(s), embedded signature(s), luma, chroma, or any other aspect of the data. In some embodiments, the video data may optionally be displayed as video images by computing device 102.

Creating the simulated USB video device and streaming video data to computing device 102 from the simulated device allows tight control of the device simulation pipeline. A variety of different USB video devices can be simulated and a variety of video data streaming scenarios can be tested. For example, an entity that wishes to test a video class driver's response to various video data streams from a particular USB video device can simply create an XML document that contains the descriptors for the particular device and create one or more video data files that can be streamed from the simulated device to the video class driver. The video data files can include any type and arrangement of video data, including video data in various formats, frame rates, etc. The simulated USB video device and/or the video data stream can also include one or more fault insertions. Fault insertions can affect the protocol with which the video data is streamed from the simulated device (e.g., the USB video device interface protocol, as specified by the USB Implementer's Forum). Fault insertions may also affect the video data itself. For example, the video data may be provided at a different frame rate than is specified for the device or than is normally allowed by video driver 124. Fault insertions may also include timing errors between video driver 124 and a simulated USB video device. For example, the video driver may make a request of the simulated USB video device and expect a response to the request in 200 milliseconds (ms). However, the simulated USB video device may be configured such that the response is sent in 500 ms, thus introducing a delay in the expected response time. Thus, fault insertions may be introduced into the video data stream before the video data is streamed to video driver 124 and/or operating system 122.

By examining the response of operating system 122 and video driver 124 to the simulated USB video device and the video data stream, an entity, such as the developer of the operating system and/or the video driver, can detect problems and/or deficiencies in the video driver design. This enables the entity to create a more robust video driver that will be compatible with a greater variety of video devices.

Device Cloning

Figure 4:
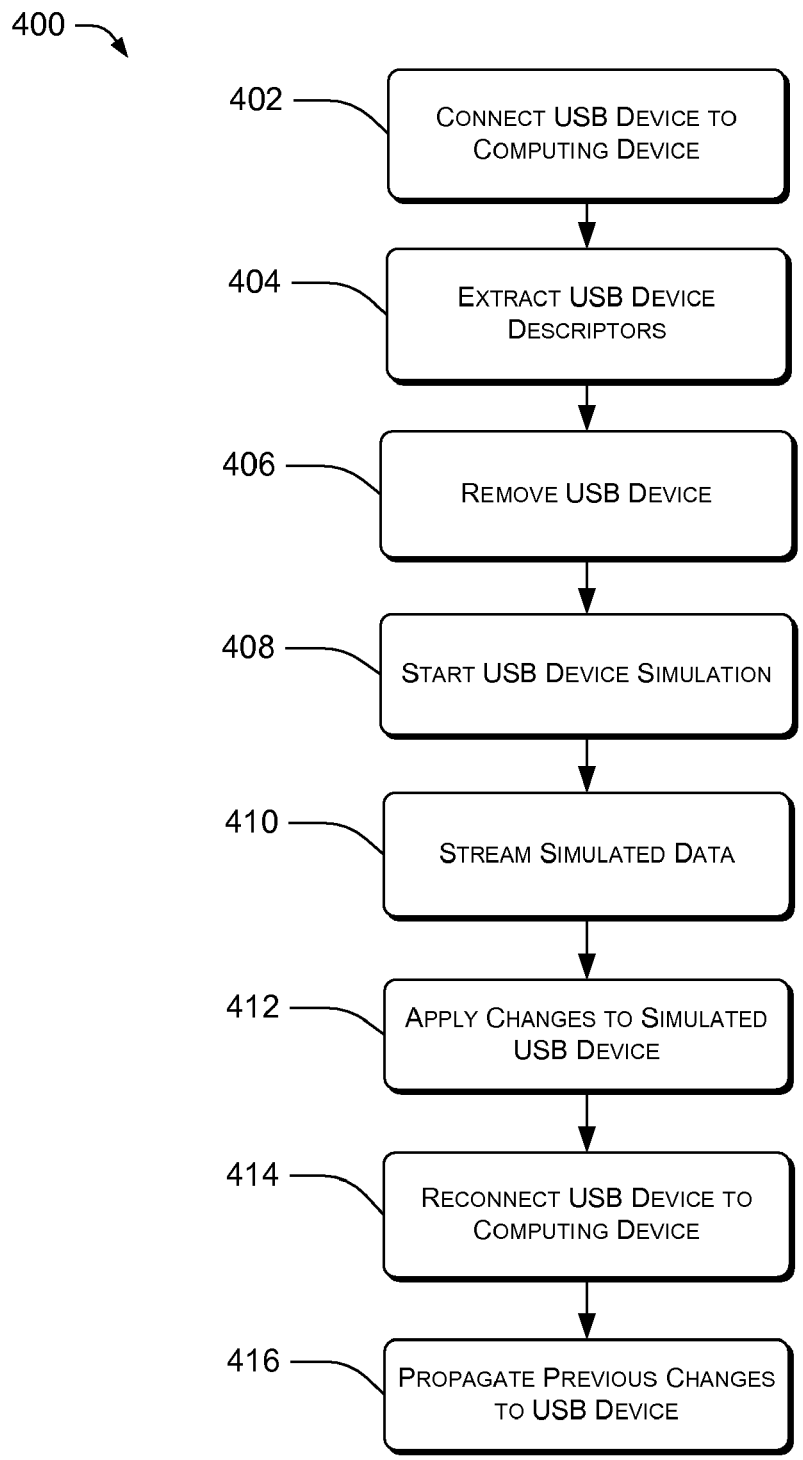
FIG. 4 is a flow diagram of an exemplary process for cloning a universal serial bus device.

The techniques discussed herein may also be utilized to clone a physical USB device. FIG. 4 shows an exemplary process 400 for cloning USB device hardware. Process 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations For discussion purposes, process 400 is described with reference to computing device 102 shown in FIG. 1.

At 402, a USB device (i.e., device hardware) is connected to a USB port associated with computing device 102. At 404, the USB device descriptors are extracted from the USB device. Act 404 may be implemented by operating system 122 or by a USB device simulator such as video device simulator 110. At 406, the USB device is removed or detached from computing device 102 and at 408, the USB device is simulated by a USB device simulator using the extracted descriptors. Thus, computing device 102 interacts with the simulated USB device as if the USB device hardware was still connected. At 410, video data is streamed from the simulated USB device to operating system 112 and/or video driver 124.

At 412, one or more changes may be made to the simulated USB device. For example, the device descriptors may be altered and/or augmented to change certain features of the simulated USB device. At 414, the USB device hardware is reconnected to a USB port associated with computing device 102. At 416, any changes made to the simulated USB device are propagated to the USB device hardware and the computing device may start interacting with the USB device hardware. Thus, as shown, the USB device simulation techniques may be utilized to clone a USB device and apply changes to the USB device

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method for testing a video device driver, the method comprising:
    loading a descriptor set, wherein the descriptor set comprises a document that contains one or more video device descriptors, wherein the one or more video device descriptors define one or more Universal Serial Bus (USB) video devices and comprise:
        a first configuration descriptor, wherein the first configuration descriptor is associated with a first power scenario;
        a second configuration descriptor, wherein the second configuration descriptor is associated with a second power scenario;
        a first interface descriptor, wherein the first interface descriptor describes a particular interface within a USB video device configuration for a first device configuration;
        a second interface descriptor, wherein the second interface descriptor describes a particular interface within a USB video device configuration for a second device configuration;
        an endpoint descriptor, wherein the endpoint descriptor comprises information required by a host to determine a bandwidth requirement of each USB video device;
    parsing the descriptor set using a simulator application to locate the video device descriptors corresponding to a USB video device;
    undergoing a configuration process, wherein the configuration process comprises:
        assigning an identifier to a simulated USB device; and
        reading the one or more video device descriptors to determine a video driver and a power requirement for the simulated USB video device;
    populating one or more video device objects with the device descriptors;
    signaling a device simulation framework (DSF) to simulate the USB video device; and
    simulating the USB video device with the video device objects, wherein the simulation is accomplished using an enhanced host controller interface simulator.

2. The method of claim 1, further comprising streaming video data from the video device simulator to a video driver on a computing device.

3. The method of claim 2, further comprising processing the video data with the video driver to produce processed video data, and comparing the processed video data with the video data.

4. The method of claim 2, further comprising introducing one or more fault insertions into the video data before it is streamed to the video driver.

5. The method of claim 4, wherein the video driver is a universal serial bus video class driver.

6. A system comprising:
    a memory;
    one or more processors coupled to the memory;
    one or more documents stored in the memory and containing device descriptors, wherein one or more device descriptors define one or more Universal Serial Bus (USB) video devices and comprises:
        a first configuration descriptor, wherein the first configuration descriptor is associated with a first power scenario;
        a second configuration descriptor, wherein the second configuration descriptor is associated with a second power scenario;
        a first interface descriptor, wherein the first interface descriptor describes a particular interface within a USB video device configuration for a first device configuration;
        a second interface descriptor, wherein the second interface descriptor describes a particular interface within a USB video device configuration for a second device configuration;
        an endpoint descriptor, wherein the endpoint descriptor comprises information required by a host to determine a bandwidth requirement of each device;
    a simulation application configured to be operated by the processor to parse the documents, obtain the device descriptors, and populate one or more descriptor objects with the descriptors;
    a device simulator driver configured to be operated by the processor to create one or more descriptor objects; and
    a device simulation framework configured to be operated by the processor to:
        simulate a device connection to the system;
        simulate the removal of the device connection to the system, suggesting to the system that the device connection has been maintained; and
        enable the system to maintain the interaction with the system following the removal of the device connection.

7. The system of claim 6, wherein the device simulation framework further comprises a universal serial bus port simulator.

8. The system of claim 6, further comprising a video driver to receive video data streamed from the device simulator driver.

9. A computer-readable storage medium storing computer-executable instructions that, when executed, perform acts comprising:
    creating a simulated hardware device based at least in part on one or more device descriptors;
    loading an extensible markup language document that contains the one or more device descriptors;
    parsing the extensible markup language document using a simulator application to obtain the one or more device descriptors, wherein the one or more device descriptors define one or more Universal Serial Bus (USB) video devices and comprises:
        a first configuration descriptor, wherein the first configuration descriptor is associated with a first power scenario;
        a second configuration descriptor, wherein the second configuration descriptor is associated with a second power scenario;
        a first interface descriptor, wherein the first interface descriptor describes a particular interface within a USB video device configuration for a first device configuration;
        a second interface descriptor, wherein the second interface descriptor describes a particular interface within a USB video device configuration for a second device configuration;
        an endpoint descriptor, wherein the endpoint descriptor comprises information required by a host to determine a bandwidth requirement of each device;
    simulating a hardware device connection to a computing device; and streaming data from the simulated hardware device to a device driver on the computing device.

10. The computer-readable storage medium as recited in claim 9, wherein creating the simulated hardware device comprises creating one or more descriptor objects and populating the descriptor objects with the device descriptors.

11. The computer-readable storage medium as recited in claim 9, wherein simulating the hardware device connection to the computing device comprises using a simulated universal serial bus port to send a notification to the computing device that a universal serial bus device has been connected to the computing device.

12. The computer-readable storage medium as recited in claim 9, wherein creating the simulated hardware device comprises:

connecting device hardware to the computing device;

extracting one or more device descriptors from the device hardware; and simulating the device hardware using the device descriptors.

13. The computer-readable storage medium as recited in claim 12, further storing computer-executable instructions that, when executed, perform acts comprising:

making one or more changes to the simulated hardware device; and propagating the changes to the device hardware.

* * * * *